UNITED STATES PATENT OFFICE.

HERMAN L. HARTENSTEIN, OF BELLAIRE, OHIO.

PROCESS OF MANUFACTURING METALLIC CARBIDS.

SPECIFICATION forming part of Letters Patent No. 630,690, dated August 8, 1899.

Application filed March 7, 1898. Renewed December 23, 1898. Serial No. 700,177. (No specimens.)

*To all whom it may concern:*

Be it known that I, HERMAN L. HARTENSTEIN, of Bellaire, in the county of Belmont and State of Ohio, have invented certain new and useful Improvements in Processes of Manufacturing Metallic Carbids, of which the following is a specification.

This invention relates to improvements in the process of manufacturing metallic carbids, and has for its object to provide a process whereby such carbids may be produced from blast-furnace slag, which is under ordinary conditions considered a waste product.

In Letters Patent Nos. 596,704, 596,705, and 596,749, granted to me January 4, 1898, I have set forth a process and apparatus whereby metallic carbids may be produced from blast-furnace slag. This slag frequently varies in its composition and is sometimes deficient in the calcium requisite for the production of a satisfactory result. I propose to remedy this deficiency by adding to the slag, preferably when this latter is in a molten condition as it is drawn from the furnace, limestone or carbonate of lime in a crushed or pulverized condition and carbon in a finely-divided state and then subject the mixture to the action of an electric current, whereby it is fused and the compound metallic carbid described in my Letters Patent No. 596,749 is produced.

In practice I prefer to employ for the purpose of treating the mixture of slag, limestone, and carbon the process set forth in my Letters Patent No. 596,749, wherein the slag is treated while still in a molten condition as it is drawn from the furnace, and for the purpose of carrying out said process I prefer to employ the apparatus set forth in my Patent No. 596,704, also hereinbefore referred to; but I wish it understood that I consider my invention as including the treatment of the materials named for the production of metallic carbids by any known process of electro-metallurgical smelting—as, for instance, by the submitting of the slag, limestone, and carbon in proper proportions to the action of the ordinary electrical furnace. This latter method, however, of carrying out my invention is ordinarily not to be preferred, on account of the expense involved in the handling of the slag.

In carrying out my invention in its preferred form I introduce the slag in the molten condition in which it is drawn from the furnace into the converter-chamber of the apparatus already referred to and add thereto the necessary proportion of limestone. This addition is preferably effected with the limestone in a finely-powdered condition, and I deem it best to introduce this finely-powdered limestone, along with the finely-powdered carbonaceous material, by forcing it into the molten slag along with a reducing-gas. The mixture is then agitated and electrically treated in the manner described in my prior Letters Patent hereinbefore referred to, the resultant product being a compound metallic carbid such as is set forth in my said Letters Patent No. 596,749.

While I have referred to carbonate of lime as the matter to be added and prefer the same by reason of its superior cheapness and accessibility, it is obvious that the limestone may be burned before adding it to the slag and that other materials containing calcium may be substituted therefor.

I claim—

1. The hereinbefore-described improvement in the manufacture of metallic carbids, which consists in adding to blast-furnace slag limestone and a carbonaceous material, and subjecting the admixture to the action of an electric current, substantially as described.

2. The hereinbefore-described process of manufacturing metallic carbids, which consists in bringing blast-furnace slag to a molten condition, adding thereto limestone and a carbonaceous material, and subjecting the molten mass to the action of an electric current, substantially as described.

3. The hereinbefore-described process of manufacturing metallic carbids, which consists in adding to molten blast-furnace slag as it comes from the furnace, limestone and a carbonaceous material, and then subjecting the molten mass to the action of an electric current, substantially as described.

4. The hereinbefore-described improvement in the manufacture of metallic carbids, which consists in diffusing through molten slag as it comes from the furnace, suitable proportions of carbonaceous material and limestone in a finely-divided state, and then subjecting the mixture to the action of an electric current, substantially as described.

HERMAN L. HARTENSTEIN.

Witnesses:
FREDERICK C. GOODWIN,
IRVINE MILLER.